US006948306B1

(12) United States Patent
Wilson et al.

(10) Patent No.: US 6,948,306 B1
(45) Date of Patent: Sep. 27, 2005

(54) APPARATUS AND METHOD OF USING SUPERSONIC COMBUSTION HEATER FOR HYPERSONIC MATERIALS AND PROPULSION TESTING

(75) Inventors: Kenneth J. Wilson, Ridgecrest, CA (US); Timothy P. Parr, Ridgecrest, CA (US); Ken Yu, Potomac, MD (US); Jaul Warren, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 294 days.

(21) Appl. No.: 10/337,667

(22) Filed: Dec. 24, 2002

(51) Int. Cl.[7] .......................... B63H 11/00; B64G 9/00; F02K 9/00; F03H 9/00; F23R 9/00

(52) U.S. Cl. ......................... 60/204; 60/200.1; 60/207; 60/208

(58) Field of Search ............................... 60/204, 200.4, 60/205, 207, 208, 210, 211, 213, 767, 768

(56) References Cited

U.S. PATENT DOCUMENTS 2,943,821 A * 7/1960 Wetherbee, Jr. .............. 244/52
3,040,516 A * 6/1962 Brees .......................... 60/208
4,136,015 A * 1/1979 Kamm et al. ............... 208/129
4,724,272 A * 2/1988 Raniere et al. ............ 585/500
4,760,695 A 8/1988 Brown et al.
H1008 H * 1/1992 Schadow et al. ............ 60/737
5,085,048 A * 2/1992 Kutschenreuter et al. ..... 60/768
5,253,474 A * 10/1993 Correa et al. ................. 60/768
5,283,985 A * 2/1994 Browning .................... 451/38
5,419,117 A * 5/1995 Greene ........................ 60/224
5,531,590 A * 7/1996 Browning ...................... 431/8
6,532,728 B1 * 3/2003 Goyne et al. ................. 60/204
6,568,171 B2 * 5/2003 Bulman ....................... 60/224
6,666,016 B2 * 12/2003 Papamoschou ............ 60/226.1
6,745,951 B2 * 6/2004 Barykin et al. ............... 239/85
6,857,261 B2 * 2/2005 Wilson et al. ................ 60/204

FOREIGN PATENT DOCUMENTS

JP 05066175 * 3/1993

* cited by examiner

*Primary Examiner*—Cheryl Tyler
*Assistant Examiner*—William H. Rodriguez
(74) *Attorney, Agent, or Firm*—Charlene A. Haley

(57) ABSTRACT

A supersonic combustion apparatus and method of using the same including a side wall cavity having an enhanced mixing system with ground-based oxygen injection for hypersonic material and engine testing.

42 Claims, 4 Drawing Sheets

"PRIOR ART"

"PRIOR ART"

APPARATUS AND METHOD OF USING SUPERSONIC COMBUSTION HEATER FOR HYPERSONIC MATERIALS AND PROPULSION TESTING

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

This invention relates to a supersonic combustion apparatus and method of using the same for hypersonic materials and propulsion testing, and more specifically, a supersonic heater having a cavity enhanced mixing system with ground-based oxygen injection for hypersonic material and engine testing.

BACKGROUND OF THE INVENTION

Hypersonic missiles have a future Naval need to reduce the time to impact on time critical targets. Supersonic combustion is a very difficult subject that has been attacked often in the past with limited success. Hypersonic missiles have utilized both ramjet and scramjet technologies and designs to reach both high speeds and long-range capabilities.

FIG. 4A illustrates an example of a ramjet engine design which operates by subsonic combustion of fuel in a stream of air compressed by the forward speed of the aircraft itself, as opposed to a normal jet engine, in which the compressor section (the fan blades) compresses the air. Ramjets operate from about Mach 2 to Mach 5. Scramjet is an acronym for Supersonic Combustion Ramjet. The scramjet differs from the ramjet in that combustion takes place at supersonic air velocities through the engine. It is mechanically simple having a burner (2), but vastly more complex aerodynamically than a jet engine. Hydrogen is normally the preferred fuel used.

A ramjet has no moving parts and achieves compression of intake air by the forward speed of the air vehicle. Air entering the intake of a supersonic aircraft is slowed by aerodynamic diffusion created by the inlet and diffuser (1) to velocities comparable to those in a turbojet augmentor. The expansion of hot gases after fuel injection and combustion accelerates the exhaust air to a velocity higher than that at the inlet and creates positive push. Solid fuel ramjet engines, whether brought to operational speed by a booster engine or air dropped from a vehicle, depend upon the introduction of air into the engine due to its forward motion. Thus the term ramjet is used. As the ram air passes through a solid fuel grain within a combustor, fuel rich gases generated by the solid fuel react with oxygen in the air inside the solid fuel bore and in the further downstream located mixing chamber of the combustor and pass out of the engine via a nozzle (3) producing thrust.

FIG. 4B illustrates an example of a scramjet engine design that (supersonic-combustion ramjet) is a ramjet engine in which the airflow through the whole engine remains supersonic. The scramjet has an inlet (1), burner (2), and nozzle (3). Scramjet technology is challenging because only limited testing can be performed in ground facilities. A scramjet works by taking in air at speeds greater than Mach 1, and using it to ignite pollution-free hydrogen, which in turn creates super-propulsion.

The speed of sound is generally about 1,300 kilometers per hour, and supersonic flight is deemed to be anything between that and Mach 4, or four times the speed of sound. Hypersonic speeds lie above that. The Concorde flies at Mach 2.2. The fastest current existing air-breathing jet, known as the SR-71 Blackbird, flies at Mach 3.6. For example, at Mach 10—or 10 times the speed of sound—the 12-foot-long, 5-foot-wide aircraft will be travelling at about two miles per second (approximately 7,200 miles per hour at sea level). Speeds over Mach 5 are defined as "hypersonic." (The Aviation History On-line Museum & GE Aircraft Engines).

Due to a wide range of flight conditions encountered by these engines during operation, the air mass flow varies considerably while the missile is changing speed and altitude. Without some means of controlling the burn rate of the solid fuel in response to changes in air mass flow excessively rich combustion chamber conditions will exist, which is very wasteful of fuel and reduces the range of the vehicle. Additionally, engine variables, such as changes in the solid fuel grain area, thrust, and combustor temperatures and pressures, as well as missile flight parameters, such as Mach number and angle of attack necessitate changes in fuel burn rate to maintain the variable within acceptable limits.

Combustion instability has been a problem of major concern. Unstable, periodic fluctuation of combustion chamber pressure that has been encountered in ramburners arises from several causes associated with combustion mechanism, aerodynamic conditions, real or apparent shifts in fuel-to-air ratio or heat release, and acoustic resonance. The periodic shedding of vortices produced in highly sheared gas flows has been recognized as a source of substantial acoustic energy for many years. For example, experimental studies have demonstrated that vortex shedding from gas flow restrictors disposed in large, segmented, solid propellant rocket motors couples with the combustion chamber acoustics to generate substantial acoustic pressures. The maximum acoustic energies are produced when the vortex shedding frequency matches one of the acoustic resonances of the combustor. It has been demonstrated that locating the restrictors near a velocity antinode generated the maximum acoustic pressures in a solid propellant rocket motor, with a highly sheared flow occurring at the grain transition boundary in boost/sustain type tactical solid propellant rocket motors.

An apparatus and method for controlling pressure oscillations caused by vortex shedding is disclosed is in U.S. Pat. No. 4,760,695 issued to Brown, et al. on Aug. 2, 1988. The '695 patent discloses an apparatus and method for controlling pressure oscillations caused by vortex shedding. Vortex shedding can lead to excessive thrust oscillations and motor vibrations, having a detrimental effect on performance. This is achieved by restricting the grain transition boundary or combustor inlet at the sudden expansion geometry, such that the gas flow separates upstream and produces a vena contracta downstream of the restriction, which combine to preclude the formation of acoustic pressure instabilities in the flowing gas stream. Such an inlet restriction also inhibits the feedback of acoustic pressure to the point of upstream gas flow separation, thereby preventing the formation of organized oscillations. The '695 patent does not present a method or apparatus, which attempts to permit a significant portion of the required enthalpy proportioned to an expansion side of the nozzle via supersonic combustion without the use of expensive film cooled nozzles. Furthermore, the '695 patent does not utilize an oxygen injection means for maintaining flame stability.

With long-duration hypersonic flight come material problems. The conventional approach to creating these high Mach high enthalpy flows is to expand very high temperature combustion through a nozzle to the desired pressure, temperature, and Mach. However, the high total temperature required puts extreme erosion on the throat of the nozzle. As a result, the conventional high temperature subsonic combustion and nozzle expansion approach requires the use of complex and expensive film cooled nozzles (estimated to be at the cost of $2 million) to survive the high enthalpy flow conditions for the relatively long test times required by the use of such device.

Therefore, there remains a need to develop a supersonic combustion heater that enhances kinetics, produces an increased high enthalpy flow source, enhances flame stability, improves mixing between fuel and air, and shortens chemical ignition delay, without the use of expensive film cooled nozzles.

SUMMARY OF THE INVENTION

The present invention is a novel supersonic combustion heater apparatus and method of using the same including a side wall cavity having an enhanced mixing system with ground-based oxygen injection for hypersonic material and engine testing.

The supersonic combustion heater apparatus shown in FIG. 1 is capable of withstanding high enthalpy flow for operating at high Mach numbers comprising an upstream air heater to provide heated high-pressure flow; a moderate temperature first nozzle having a throat to withstand the heated high pressure flow, a three fluid stream injection system, and an expansion zone including a second nozzle.

The three fluid stream injection system comprises a first stream that includes a boundary layer flow which is created downstream of the first nozzle. The second fluid stream includes a fuel injection means for quick ignition and rapid mixing with the vortices. Finally, the third fluid stream includes an oxygen injection means for maintaining flame stabilization.

The most preferred embodiment of the present invention is a method of using supersonic combustion to create a high enthalpy flow source for application in scramjets comprising the steps of: providing a heated high-pressure flow which is expanded through a first nozzle creating a supersonic duct flow having a boundary layer flow; generating coherent vortices using a resonant acoustic side wall cavity having a downstream lip which causes shedding of periodic coherent vortices downstream to enhance supersonic mixing rates and shorten mixing times while increasing combustion efficiency; injecting three fluid streams for rapid mixing including the duct flow, the fuel, and auxiliary oxygen; and partitioning a significant portion of the total enthalpy to the expansion zone and directing the remaining enthalpy via supersonic combustion downstream of the second expansion nozzle.

It is an object of the present invention to provide a supersonic heater which uses supersonic combustion with advanced active combustion control to create a high enthalpy flow source to obviate the need for extremely expensive high temperature film cooled nozzles.

It is another object of the invention to provide a supersonic heater that creates resonant acoustic cavity driven coherent vorticity to enhance mixing in the supersonic combustion zone and enable heat addition in the expansion zone of the duct flow.

It is a further object of the invention to provide a supersonic combustion heater construction that makes use of localized make-up oxygen injection for flame stabilization.

It is still a further object of the invention to provide a supersonic combustion heater that balances between enhanced mixing and increased internal drag to give the highest probability of successful supersonic combustion.

It is still another further object of the invention to provide a supersonic combustion heater that will reach very high Mach numbers at high altitude conditions.

Still yet another further object of the invention is to provide a tactical missile capable of flying for up to eleven (11) minutes at about Mach 6 or higher.

It is to be understood that the foregoing general description and the following detailed description are exemplary and explanatory only and are not to be viewed as being restrictive of the present invention, as claimed. These and other objects, features and advantages of the present invention will become apparent after a review of the following detailed description of the disclosed embodiments and the appended claims.

BRIEF DESCRIPTION OF THE DRAWINGS

Other objects, advantages, and novel features of the present invention will be apparent from the following detailed description when considered with the accompanying drawings.

DETAILED DESCRIPTION OF THE INVENTION

Figure 1:
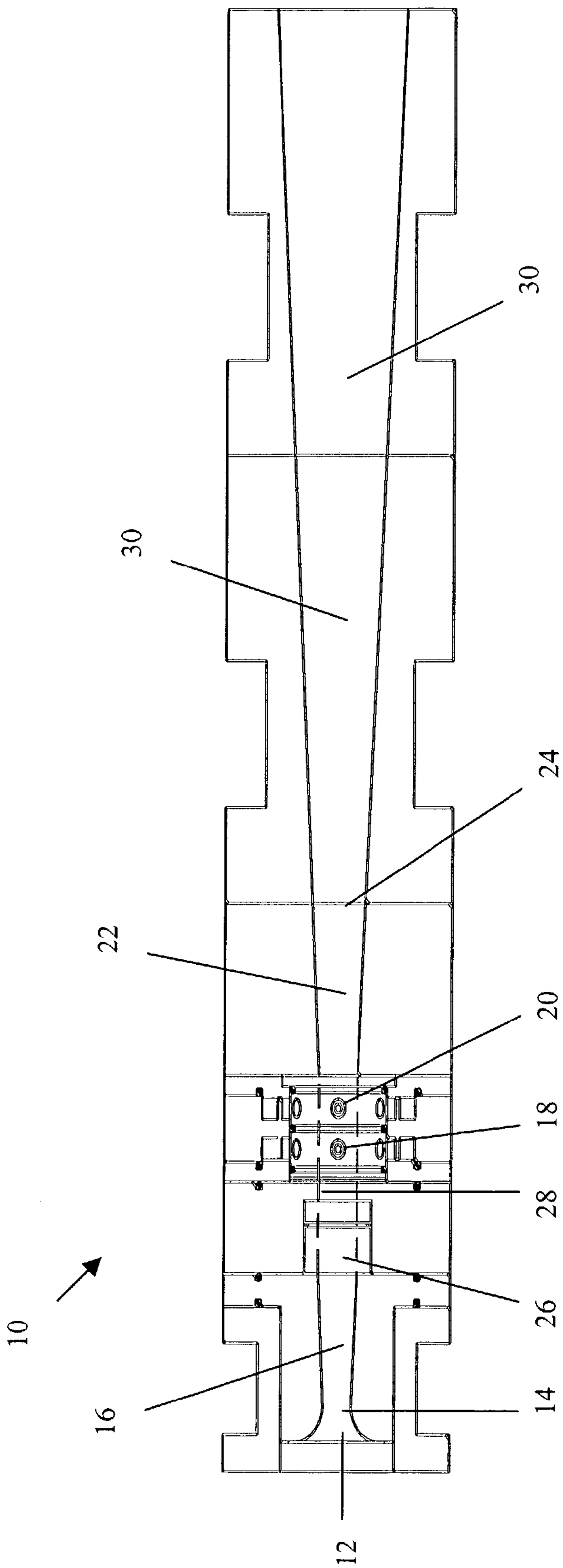
FIG. 1 is a cross-sectional view of a preferred embodiment of the present invention showing the supersonic combustion heater including a first nozzle, a side wall cavity, a fuel injection means, an oxygen injection means, an expansion zone, a second nozzle, and a divergent area, where the duct flow is left to right according to the present invention.

The present invention is a novel supersonic combustion apparatus 10 and method of using the same. The supersonic combustion heater apparatus 10 shown in FIG. 1, is capable of withstanding high enthalpy flow for operating at high Mach numbers comprising a means for providing a high-pressure flow; a moderate temperature first nozzle 12 having a throat 14 to withstand the heated high-pressure flow, a three fluid stream injection system 16, 18, and 20, and an expansion zone 22 including a second (expansion) nozzle 24.

The three fluid stream injection system 16, 18, and 20 comprises a first stream 16 that includes a boundary layer flow which is created downstream of the first nozzle 12. The second fluid stream includes a fuel injection means 18 for quick ignition and rapid mixing with the vortices. Finally, the third fluid stream includes an oxygen injection means 20 for maintaining flame stabilization. In addition, the supersonic combustion region includes at least one acoustic cavity 26 having a downstream lip 28 to cause shedding of periodic coherent vortices downstream. Furthermore, an expansion zone or region 22 is dimensioned and configured to withstand high enthalpy and a supersonic combustion flow. The expansion zone 22 also includes a second (expansion) nozzle 24, and a divergent area 30 dimensioned and configured to withstand high enthalpy flow and a supersonic combustion flow. The divergent area 30 is where increasing high Mach speeds are achieved as the supersonic combustion flow reaches downstream of the divergent area 30.

The term "high pressure" is defined to include approximately 100 psi to about 2000 psi. The term "high enthalpy" is defined to include approximately 500 Kelvin to about 24000 Kelvin at approximately Mach 3 to about Mach 6.5. Finally, the term "high Mach" refers to speed of approximately Mach 3 to about Mach 6.5.

It is known that with long-duration hypersonic flight come material problems. The present invention 10 is preferably constructed to test materials, such as radomes, flight surfaces, and inlets, at the high enthalpy of hypersonic flight; however, the supersonic combustion heater can be used for other non-related purposes. In addition, air-breathing propulsion systems for hypersonic platforms must be ground tested as well to characterize their performance at hypersonic flight speeds. In both cases high-enthalpy high-speed high-mass rate flow test facilities are required.

Cavity 26 enhanced active/passive mixing technology along with the ground based luxury of oxygen injection 20 and added combustor length and weight of the present supersonic combustion heater 10 is ideal for hypersonic material and engine testing. The construction of the present invention 10 is based on a side wall cavity 26 in the supersonic flow duct that is designed for a desired acoustic resonance. The boundary layer flow in the supersonic flow duct is shown to flap over this cavity 26 and periodically impinge on its downstream lip 28, which causes shedding of periodic coherent vortices downstream. The injection 18 of a desired combustible fuel is preferably just downstream of this vortex shedding point and the fuel is entrained into the supersonic vortex and rapidly mixes with the flow. This rapid mixing and the flame holding characteristics of the cavity 26 are critical to maintaining supersonic combustion. Furthermore, present invention 10 is related to utilizing flow vortices for controlling heat transfer.

The preferred embodiment of the present invention 10 makes use of resonant acoustic cavity driven coherent vorticity to enhance mixing in the supersonic combustion zone and enable heat addition in the expansion portion 22 of the duct flow. FIG. 1 illustrates the preferred embodiment of the supersonic combustion heater 10 (axissymmetric burner). The present invention includes an upstream air heater or vitiator (not shown) to provide the heated high-pressure flow. Either an upstream vitiator or an air heater provides heated high-pressure flow that is expanded through the first nozzle 12 which accelerates flow to supersonic velocities. A side wall cavity 26 of length to depth ratio of about four to one is positioned just upstream of the supersonic combustion fuel injection station 18. The preferred embodiment of the present invention 10 includes a make-up oxygen injection means 20 localized to enhance flame stability.

In the present invention 10, a significant portion of the required enthalpy is proportioned to the expansion side 22 of the second nozzle 24 via supersonic combustion. This places some of the systems required enthalpy in the expansion zone 22 instead of requiring the total enthalpy to pass through an erosion susceptible nozzle throat. This construction obviates the need for extremely expensive high temperature nozzles. The supersonic combustion apparatus 10 makes use of resonant acoustic cavity driven coherent vorticity to enhance mixing in the supersonic combustion zone and enable heat addition in the expansion portion 22 of the duct flow.

The most preferred embodiment of the present invention 10 is a supersonic combustion heater apparatus capable of withstanding high enthalpy flow for operating at high Mach numbers comprising: an upstream air heater to provide heated high-pressure flow; a moderate temperature first nozzle 12 having a throat 14 to withstand the heated high-pressure flow, whereby a boundary layer flow is created downstream of the first nozzle 12; a supersonic combustion region including at least one acoustic cavity 26 having a downstream lip 28 to cause shedding of periodic coherent vortices downstream, a fuel injection means 18 for quick ignition and rapid mixing with the vortices, an oxygen injection means 20 for maintaining flame stabilization; an expansion zone or region 22 dimensioned and configured for withstanding high enthalpy and a supersonic combustion flow, the expansion zone 22 including a second expansion nozzle 24, and a divergent area 30 dimensioned and configured to withstand high enthalpy flow and a supersonic combustion flow, whereby increasing high Mach speeds are achieved as the supersonic combustion flow reaches downstream of the divergent area 30.

The heated high-pressure flow in another embodiment can be generated by either an air heater or a vitiator which supplies oxygen into the high-pressure flow. The first nozzle 12 is constructed to withstand a partial expansion to supersonic velocities. The side wall cavity 26 is dimensioned and configured for desired acoustic resonance to aid in driving coherent vorticity within the boundary layer flow. The length to depth ratio of the side wall cavity 26 is preferably of about four to one. The downstream lip 28 of the side wall cavity 26 causes shedding of periodic coherent lateral vortices downstream.

The fuel injection means 18 supplies a combustible fuel into the wake of the side wall cavity 26. The preferred combustible fuel is selected from the group consisting of hydrogen and hydrocarbons either liquid or gaseous, or the like, or any combination of thereof. The most preferred combustible fuel utilized with the present invention is hydrogen. The oxygen injection means 20 is preferably introduced downstream of the fuel injection means 18 and the cavity 26 for maintaining supersonic flow and combustion. However, the oxygen injection means 20 can be situated adjacent to the fuel injection means 18. The second nozzle 24 is constructed to withstand additional expansion up to about Mach 3.0 or greater.

The objective is to utilize supersonic combustion, with advanced active combustion control; to create a high enthalpy flow source without expensive film cooled nozzles. For that reason, tests were undertaken to expand below atmospheric conditions and changes in air speed from Mach 3 to 3.5 and were recorded. Increasing high Mach speeds are achieved as the supersonic combustion flow reaches downstream of the divergent area, between about Mach 1.0 to about Mach 6.0.

EXAMPLE 1

Figure 2:
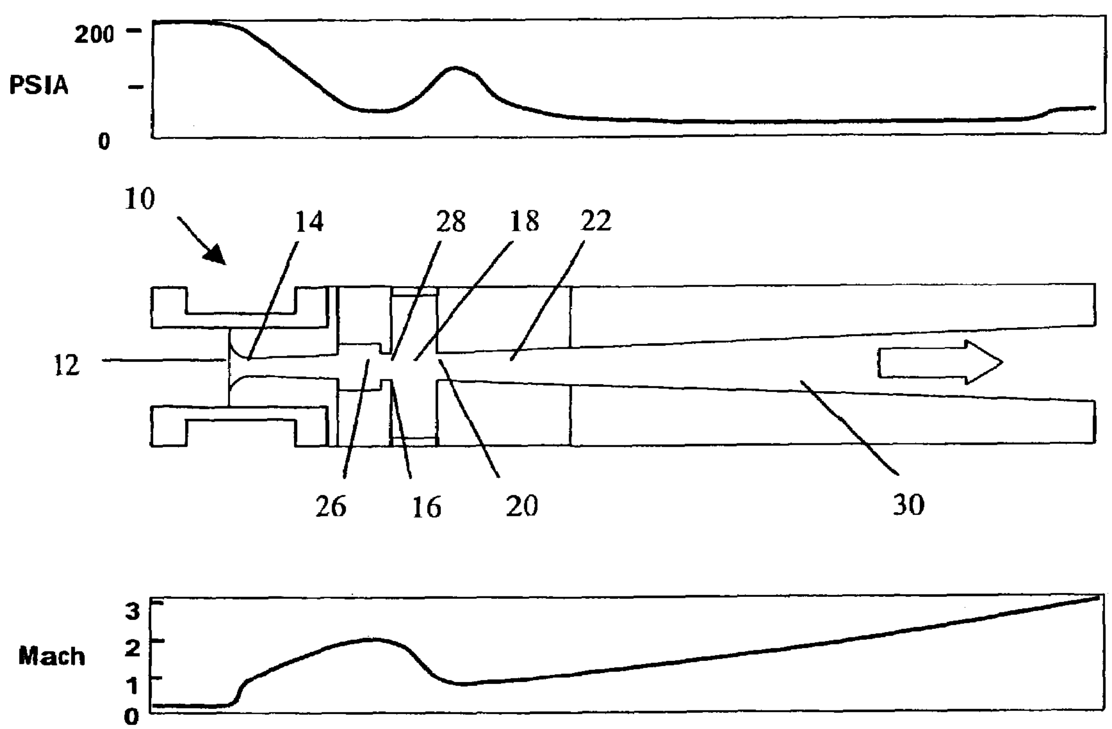
FIG. 2 illustrates a cross-sectional view of a preferred embodiment of the present invention in relation to two schematic diagrams showing the pressure variations (top) and Mach differentials (bottom) scaled according to the present invention (partially from measurement, partially from calculation).

For testing purposes, the expansion zone or region 22 is instrumented with multiple static pressure probes (not shown). FIG. 2 illustrates schematic graphs showing the pressure (top) and Mach (bottom) scaled to the device 10 (partially from measurement, partially from calculation). The present invention 10 passed the testing of the materials and propulsion systems required for very high speed strike on time critical targets. Stable supersonic combustion was successfully achieved with the first design.

Figure 3:
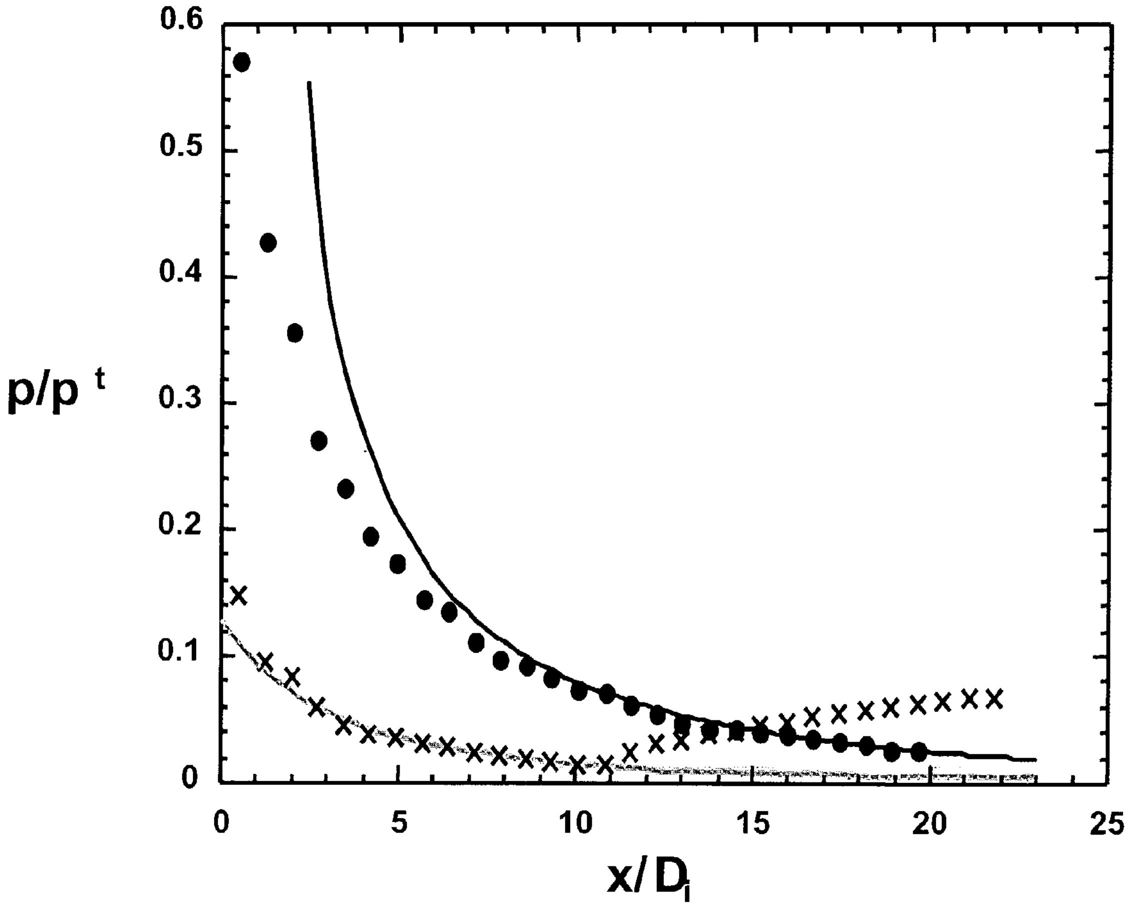
FIG. 3 is a graph that illustrates static pressure axial profiles for the supersonic combustion apparatus operating under non-reacting (crosses) and supersonic combustion (circles) conditions according to the present invention.
Figure 4A:
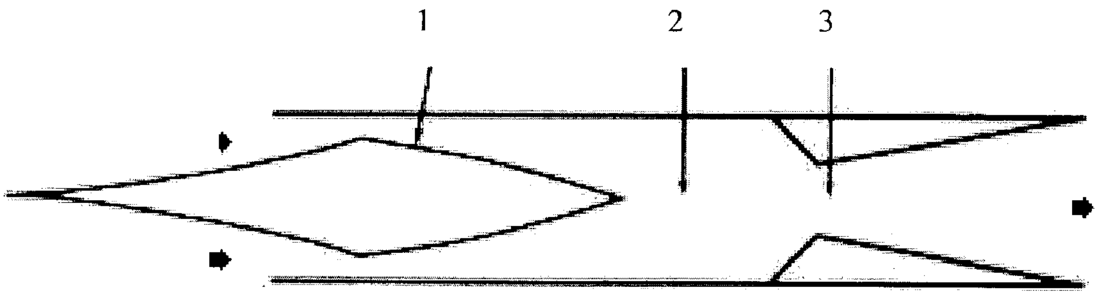
FIGS. 4A and 4B illustrate prior art engine designs, 4A shows a diagram of a ramjet engine design, and 4B shows a diagram of a scramjet engine design.
Figure 4B:
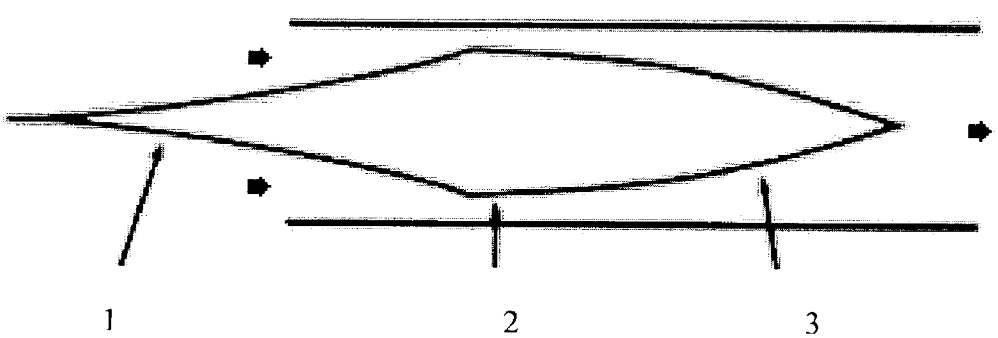

FIG. 3 shows the results of the static pressure probe profiles. Atmospheric conditions correspond to $p/p_t=0.072$. The abscissa is the axial position with respect to the start of the expansion just downstream of the fuel injection station 18. It is scaled by the initial flow diameter ($D_1=16$ mm). The ordinate is the static pressure scaled to the initial total pressure. The X's are the data for the non-reacting expansion and the solid line is the simulation of that case. The circles are the data for the combusting case and the gray line is the simulation for that case. The second nozzle 24 is over expanded for the source conditions, but the shock back up to atmospheric conditions for the combustion curve occurs near the exit and is not shown. The non-reacting case also over expands but it shocks back up internally at x/D of about 12. The non-reacting simulation very closely matches the data up to the point that the flow shocks up to atmospheric. This shows that the inlet conditions of Mach 2 flow have been achieved.

Also shown is a simulation based on a Mach 3 exit condition for the supersonic combusting case. In the reacting case, the expansion brought the static pressure to sub atmospheric: ⅓ atm, overexpanded for the operating pressure in the vitiated heater. At the ⅓ atm position the Mach number was calculated to be 3.05. The model profile back extrapolates an adiabatic expansion given the design expansion angle of the device.

The measured static pressure data matches this simulation back to an x/D of about 8. At shorter axial distances the measured data fall below the simulation. This shows where the supersonic combustion heat release is taking place; as the energy is released the measured static pressure rises to meet the simulation curve. Therefore, all of the combustion appears to be completed in a distance of about 12 cm. Since this is in the expansion zone 22, and the pressure is continuously decreasing, this combustion is occurring supersonically and a major portion of the total enthalpy is being introduced downstream of the throat of the second nozzle 24 in a zone less susceptible to erosion. It was shown that the erosion in a system where enthalpy is distributed into the expansion zone 22 is much less than one where the entire enthalpy must pass through a throat. As a result, the goal of supersonic combustion has been achieved, even in the first constructed apparatus 10. The goal of enthalpy addition downstream of the throat of the second nozzle 24 via supersonic combustion has been shown to be achievable in its construction of a high enthalpy heater for hypersonics testing. The present invention will permit creation of reduced cost ground test facilities for hypersonic and low altitude high supersonic strike weapons applicable to time critical targets.

Finally, we must address the issue of scale up to usable mass flows and areas. Scale up issues to be addressed includes the cavity design and the secondary fuel and oxygen injection. With a larger device less of the area is boundary layer into which the fuel and oxygen are injected and this may change the performance.

The most preferred embodiment of the present invention 10 is a method of using supersonic combustion to create a high enthalpy flow source for application in scramjets comprising the steps of: providing advanced active combustion control by controlling input enthalpy with a preheater; providing the heated high-pressure flow which is expanded through the first nozzle creating a duct flow having a boundary layer flow; generating coherent vortices using a resonant acoustic side wall cavity having a downstream lip; flapping of the boundary layer flow over the side wall cavity with periodical impinging on its downstream lip causes shedding of periodic coherent vortices downstream to enhance supersonic mixing rates and shorten mixing times while increasing combustion efficiency; injecting fuel downstream of the vortex shedding point; entraining of fuel into the supersonic vortex and rapid mixing with the duct flow; injecting oxygen for enhancing kinetics, increasing enthalpy, and enhancing flame stability; and partitioning a significant portion of the total enthalpy to the expansion zone and directing the remaining enthalpy via supersonic combustion downstream of the second expansion nozzle.

The downstream lip 28 in the side wall cavity 26 causes shedding of periodic coherent vortices downstream to enhance supersonic mixing rates and shorten mixing times while increasing combustion efficiency. The above method is based on a three fluid stream injection system comprising the duct flow 16, the fuel 18, and auxiliary oxygen 20 for rapid mixing of such streams. The heated high-pressure flow is preferably utilized by a vitiator or air heater; however, any mechanism that provides the desired heated high-pressure can be used with the present invention 10.

The step of injecting fuel downstream of the vortex shedding point is most preferably carried out with at least one combustible propellant. The combustible fuel is selected from the group consisting of hydrogen and hydrocarbons either liquid or gaseous, or the like, or combination thereof. However, the most preferred combustible fuel is hydrogen. The method of the present invention 10 further comprises the step of preheating the fuel. In addition, the method of the present invention 10 further comprises the step of optimizing local fuel to air/oxidizer ratios and temperature to insure ignition.

Resonant acoustic cavities 26 generate coherent vortices which enhance supersonic mixing rates and shorten mixing times while increasing combustion efficiency. It has been shown that strong supersonic vortices and greatly enhanced mixing rates are shown with surrogate fuel injection (cold flow). As a result, there are tradeoffs between enhanced mixing and increased internal drag. However, a supersonic combustor used for ground testing can tolerate internal drag; therefore, the present invention 10 can optimize mixing and give the highest probability of successful supersonic combustion.

The application of the present invention 10 includes testing hypersonic vehicle components such as radomes, flight surfaces, and engines at high Mach number and high total temperature.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A supersonic combustion heater apparatus capable of withstanding high enthalpy flow for operating at high Mach numbers comprising:

a means for providing a high-pressure flow;

a first nozzle having a throat to withstand said high pressure flow, whereby a boundary layer flow is created downstream of said first nozzle;

a supersonic combustion region is located adjacent to said first nozzle, said region including a fuel injection means for ignition and an oxygen injection means for maintaining flame stabilization; and an expansion zone dimensioned and configured for withstanding high enthalpy and a supersonic combustion flow, said expansion zone is adjacent to said supersonic combustion region, said expansion zone including a second expansion nozzle, and a divergent area dimensioned and configured to withstand high enthalpy flow and a supersonic combustion flow, said divergent area is adjacent to said supersonic combustion region whereby increasing high Mach speeds are achieved as said supersonic combustion flow reaches downstream of said divergent area.

2. A supersonic combustion heater apparatus capable of withstanding high enthalpy flow for operating at high Mach numbers comprising:

an upstream air heater to provide heated high-pressure flow;

a first nozzle having a throat to withstand said heated high-pressure flow, whereby a boundary layer flow is created downstream of said first nozzle;

a supersonic combustion region including at least one acoustic cavity having a downstream lip to cause shedding of periodic coherent vortices downstream, a fuel injection means for ignition and rapid mixing with said vortices, and an oxygen injection means for maintaining flame stabilization; and an expansion zone dimensioned and configured for withstanding high enthalpy and a supersonic combustion flow, said expansion zone including a second expansion nozzle, and a divergent area dimensioned and configured to withstand high enthalpy flow and a supersonic combustion flow, wherein increasing high Mach speeds are achieved as said supersonic combustion flow reaches downstream of said divergent area.

3. The supersonic combustion apparatus according to claim 1, wherein said air heater is a vitiator which supplies oxygen into said heated high-pressure flow.

4. The supersonic combustion apparatus according to claim 1, wherein said first nozzle is constructed to withstand a partial expansion beyond Mach 1.0.

5. The supersonic combustion apparatus according to claim 1, wherein said cavity having a side wall cavity of a length to depth ratio of about four to one.

6. The supersonic combustion apparatus according to claim 1, wherein said cavity is dimensioned and configured for desired acoustic resonance to aid in driving coherent vorticity within said boundary layer flow.

7. The supersonic combustion apparatus according to claim 1, wherein said fuel injection means supplies a combustible fuel into the wake of said cavity.

8. The supersonic combustion apparatus according to claim 6, wherein said combustible fuel is selected from the group consisting of hydrogen and hydrocarbons or the like, or any combination thereof.

9. The supersonic combustion apparatus according to claim 1, wherein said combustible fuel is hydrogen.

10. The supersonic combustion apparatus according to claim 1, wherein said oxygen injection means is introduced adjacent of said fuel injection means and said cavity for maintaining supersonic flow and combustion.

11. The supersonic combustion apparatus according to claim 1, wherein said second nozzle is constructed to withstand a partial expansion of Mach 3.0 or greater.

12. The supersonic combustion apparatus according to claim 1, wherein said increasing high Mach speeds are achieved as said supersonic combustion flow reaches downstream of said divergent area is between about Mach 1.0 to about Mach 6.0.

13. The supersonic combustion apparatus according to claim 1, wherein said high Mach speeds are from approximately Mach 3 to about Mach 6.5.

14. The supersonic combustion apparatus according to claim 1, wherein said high pressure flow is between approximately 100 psi to about 2000 psi.

15. The supersonic combustion apparatus according to claim 1, wherein said high enthalpy is from approximately 500 Kelvin to about 2400 Kelvin at about Mach 3.0 to about 6.5.

16. A supersonic combustion apparatus and heater capable of withstanding high enthalpy flow for operating at high Mach numbers comprising:

air heater to provide heated high-pressure flow;

a subsonic combustion region including:

a first combustor chamber for subsonic combustion;

a first moderate temperature first nozzle having a throat to withstand subsonic combustion flow, said heated high-pressure flow is expanded through said first nozzle creating a boundary layer flow downstream of said nozzle; and a supersonic combustion region including:

at least one side wall cavity having a length to depth ratio dimensioned and configured for desired acoustic resonance, said cavity having a downstream lip, whereby said boundary layer flow flaps over said cavity to impinge on said downstream lip, thereby causing period shedding of vortices downstream of said boundary layer flow;

at least one fuel injection means for supplying a combustible fuel for ignition and rapid mixing with said vortices to enhance supersonic combustion;

at least one oxygen injection means adjacent of said cavity and said vortices for maintaining flame stabilization; said fuel injection means and said oxygen injection means are for maintaining supersonic flow and combustion;

an expansion zone being downstream of said cavity, said expansion zone having an expansion angle dimensioned and configured for withstanding high enthalpy and a supersonic combustion flow, said expansion zone sustaining a significant portion of said high enthalpy;

a second expansion nozzle having a throat downstream of said expansion zone, said second nozzle to withstand the remaining portion of the total enthalpy and supersonic combustion flow; and a divergent area having an expansion angle dimensioned and configured to withstand high enthalpy flow and a supersonic combustion flow, said divergent area is downstream of said second nozzle, wherein increasing high Mach speeds are achieved while the supersonic combustions flow reaches downstream of said divergent area.

17. The supersonic combustion apparatus according to claim 16, wherein said air heater is an axissymmetric burner.

18. The supersonic combustion apparatus according to claim 16, wherein said air heater is a vitiator which supplies oxygen into said heated high pressure flow.

19. The supersonic combustion apparatus according to claim 16, wherein said first nozzle is constructed to withstand a partial expansion beyond Mach 1.0.

20. The supersonic combustion apparatus according to claim 16, wherein said first nozzle is constructed to withstand a partial expansion to accelerate said flow to supersonic velocities.

21. The supersonic combustion apparatus according to claim 16, wherein said cavity is a side wall cavity having a length to depth ratio of about four to one.

22. The supersonic combustion apparatus according to claim 16, wherein said cavity is dimensioned and configured for desired acoustic resonance to aid in driving coherent vorticity within said boundary layer flow.

23. The supersonic combustion apparatus according to claim 16, wherein said downstream lip of said cavity causes shedding of periodic coherent lateral vortices downstream.

24. The supersonic combustion apparatus according to claim 16, wherein said fuel injection means supplies a combustible fuel into the wake of said cavity.

25. The supersonic combustion apparatus according to claim 24, wherein said combustible fuel is selected from the group consisting of hydrogen and hydrocarbons, or the like.

26. The supersonic combustion apparatus according to claim 16, wherein said combustible fuel is hydrogen.

27. The supersonic combustion apparatus according to claim 16, wherein said oxygen injection means is introduced downstream to said fuel injection means.

28. The supersonic combustion apparatus according to claim 16, wherein said second nozzle is constructed to withstand a partial expansion of Mach 3.0 or greater.

29. The supersonic combustion apparatus according to claim 16, wherein said increasing high Mach speeds are achieved as said supersonic combustion flow reaches downstream of said divergent area is between about Mach 1.0 to about Mach 8.0.

30. The supersonic combustion apparatus according to claim 16, wherein said increasing high Mach speeds are achieved as said supersonic combustion flow reaches downstream of said divergent area is between about Mach 1.0 to about Mach 6.0.

31. A method of using supersonic combustion to create a high enthalpy flow source for application in scramjets comprising the steps of:

providing a high-pressure flow which is expanded through a first nozzle creating a duct flow having a boundary layer flow;

injecting three fluid streams for rapid mixing including the duct flow, a fuel, and auxiliary oxygen; and partitioning a significant portion of the total enthalpy to an expansion zone and directing the remaining enthalpy via supersonic combustion downstream of a second expansion nozzle.

32. A method of using supersonic combustion to create a high enthalpy flow source for application in scramjets comprising the steps of:

providing advanced active combustion control by controlling input enthalpy with a preheater;

providing a heated high-pressure flow which is expanded through a first nozzle creating a duct flow having a boundary layer flow;

generating coherent vortices using a resonant acoustic side wall cavity having a downstream lip;

flapping of said boundary layer flow over said side wall cavity with periodical impinging on its downstream lip causes shedding of periodic coherent vortices downstream to enhance supersonic mixing rates and shorten mixing times while increasing combustion efficiency;

injecting fuel downstream of the vortex shedding point;

entraining of fuel into the supersonic vortex and rapid mixing with the duct flow;

injecting oxygen for enhancing kinetics, increasing enthalpy, and enhancing flame stability; and partitioning a significant portion of the total enthalpy to an expansion zone and directing the remaining enthalpy via supersonic combustion downstream of a second expansion nozzle, wherein increasing high Mach speeds are achieved while the supersonic combustions flow reaches downstream of a divergent area.

33. The method according to claim 32, wherein the step of providing said heated high-pressure flow utilizes a vitiator.

34. The method according to claim 32, wherein the step of providing said heated high-pressure flow utilizes an air heater.

35. The method according to claim 32, wherein the step of injecting fuel downstream of said vortex shedding point is carried out with at least one combustible propellant.

36. The method according to claim 32, wherein the combustible propellant is selected from the group consisting of hydrogen and hydrocarbons, or the like.

37. The method according to claim 32, wherein the combustible propellant is hydrogen.

38. The method according to claim 32, further comprises the step of preheating the fuel.

39. The method according to claim 32, further comprising the step of optimizing local fuel to air/oxidizer ratios and temperature to insure ignition.

40. The method according to claim 32, wherein said high Mach speeds are from approximately Mach 3 to about Mach 6.5.

41. The method according to claim 32, wherein said high pressure flow is between approximately 100 psi to about 2000 psi.

42. The method according to claim 32, wherein said high enthalpy is from approximately 500 Kelvin to about 2400 Kelvin at about Mach 3.0 to about 6.5.

* * * * *